United States Patent [19]
Wong

[11] Patent Number: 6,094,711
[45] Date of Patent: Jul. 25, 2000

[54] APPARATUS AND METHOD FOR REDUCING DATA BUS PIN COUNT OF AN INTERFACE WHILE SUBSTANTIALLY MAINTAINING PERFORMANCE

[75] Inventor: Samson Wong, Santa Clara, Calif.

[73] Assignee: Sun Microsystems, Inc., Palo Alto, Calif.

[21] Appl. No.: 08/877,455

[22] Filed: Jun. 17, 1997

[51] Int. Cl.[7] .............................. G06F 12/00; G06F 13/14
[52] U.S. Cl. .......................... 711/169; 711/122; 711/140; 711/167; 710/126; 710/127; 710/129
[58] Field of Search .................................... 711/122, 140, 711/127, 129, 167, 3, 169; 395/800.29, 840; 710/126, 127, 129

[56] References Cited

U.S. PATENT DOCUMENTS

| | | | |
|---|---|---|---|
| 4,424,561 | 1/1984 | Stanley et al. | 711/3 |
| 5,301,281 | 4/1994 | Kennedy | 710/127 |
| 5,303,353 | 4/1994 | Matsuura et al. | 710/127 |
| 5,367,632 | 11/1994 | Bowen et al. | 395/518 |
| 5,548,786 | 8/1996 | Amini et al. | 710/22 |
| 5,627,991 | 5/1997 | Hose, Jr. et al. | 711/129 |
| 5,764,946 | 6/1998 | Tran et al. | 712/239 |
| 5,819,059 | 10/1998 | Tran | 712/213 |
| 5,860,104 | 1/1999 | Witt et al. | 711/137 |

OTHER PUBLICATIONS

Sun Microsystems, Inc. 13 "The UltraSPARC Processor—Technology White Paper", Chapters 1–5, internet address: http://www.sun.com/sparc/whitepapers/UltraSPARCtechnology/.

Primary Examiner—John W. Cabeca
Assistant Examiner—Pierre-Michel Bataille
Attorney, Agent, or Firm—Skjerven, Morrill, MacPherson, Franklin & Friel, LLP; Ken J. Koestner

[57] ABSTRACT

The pin count of a processor is substantially reduced while effectively maintaining processor performance by using a staging register to receive and store a first data segment from a bus. A second data segment is received from the bus in a subsequent bus cycle and loaded into a cache. A steering circuit dynamically selects the transfer of the first or the second segment to a processor core, and orders positioning of the first and second data segments into the cache. In some embodiments, the cache is a first level cache and a second level cache is inserted between the bus and the processor. In these embodiments, the processor includes a bypassing circuit for designating the ordering of bus data in response to a memory access that misses the first level cache and hits the second level cache.

19 Claims, 5 Drawing Sheets

APPARATUS AND METHOD FOR REDUCING DATA BUS PIN COUNT OF AN INTERFACE WHILE SUBSTANTIALLY MAINTAINING PERFORMANCE

BACKGROUND OF THE INVENTION

1. Field of the Invention

The present invention relates to a computer systems and processors. More specifically, the present invention relates to an interface apparatus and operating method for interfacing a bus to a processor.

2. Description of the Related Art

Advanced high-performance microprocessors, for example UltraSPARC-I and UltraSPARC-II from Sun Microsystems, Inc., have an on-chip data cache that is typically 128 bits (16 bytes) wide. To match the width of the data cache, which is also called a first-level or L1 cache, the microprocessor usually has a 128-bit data bus that interacts with a memory subsystem, either a second-level L2 cache or a DRAM memory, to supply requested data that are absent from the on-chip data cache during an operation such as a data cache read miss. The 128-bit data bus is very large, resulting in a high pin count that is generally excessive in size and cost for many computer system applications. For example, a 128-bit data bus realistically increases the size and cost of a microprocessor beyond the realm of the high-volume desktop computer market. A 64-bit data bus is much more advantageous and positions the microprocessor in the desirable markets.

However, a 64-bit data bus must be made compatible with the 128-bit cache line. The transferring of a 128-bit cache line over the 64-bit data bus typically is performed by segmenting the data into two parts. Segmenting or dividing of the data into two parts introduces several disadvantages. For example, segmenting the data inserts an extra delay into the timing pathways of the microprocessor. Furthermore, segmenting of the data in some systems leads to substantial rework of the first-level (L1) data cache organization. Segmenting of the data may also lead to a decrease in processor performance.

High-performance microprocessors such as the UltraSPARC-I and the UltraSPARC-II are 64-bit microprocessors so that only half of the 128-bit data returned from a memory subsystem is used to complete a computation. The other half of the 128-bit data is fetched to maintain locality of the two data halves since the second 64-bit data segment may be referenced subsequently so that the extra 64-bit bandwidth of the 128-bit cache line can be optimized for performance and cost.

FIG. 1 illustrates the 128-bit input data path 100 of an advanced high-performance microprocessor, specifically the UltraSPARC-I microprocessor. The input data path 100 serves as an interface between a memory 102 and a CPU core 104. The memory 102 is connected to a 128-bit input data register 106 which buffers 128-bit data from the memory 102 for transfer to the 64-bit CPU core 104. The 128 bits of the input data path 100 are connected both in a direct pathway to the CPU core 104 and in a pathway through a 128-bit level-1 data cache 108.

The data cache write pathway is first applied to a 2-to-1 data cache multiplexer 110 that selects a 128-bit input signal from either the memory 102 via the input data register 106 or the CPU core 104. The CPU core 104 supplies the 128 bits in the form of two 64-bit store data elements. The data cache multiplexer 110 is controlled by a fill request signal that selects between a data cache fill operation for filling the data cache 108 from the memory 102 or a data store operation for storing data from the CPU core 104 to the data cache 108. The data input to the data cache 108 is in the form of 128 bit lines and 128-bit lines are stored in the data cache 108, but the data cache 108 divides the 128-bit lines into 64-bit segments and aligns the 64-bit segments for application to the 64-bit CPU core 104.

The direct pathway from the memory 102 to the CPU core 104 includes a CPU core multiplexer 112, a 2-to-1 multiplexer for selecting between the lower-order 64 bits and the higher-order 64 bits of the 128-bit data from the memory 102.

While microprocessors such as the UltraSPARC-I and the UltraSPARC-II are greatly advantageous for achieving high performance, the pin-count of an integrated circuit that supports a 128-bit data input is excessive for some computer system market segments. In particular, the 128-bit data input is highly suitable and advantageous for market segments such as the high-end workstation market. However, the markets for low-end workstations, home personal computers, desktop computers, and the like more cost-effectively use a 64-bit data input connection while maintaining a 128-bit data cache linesize.

What is needed is an apparatus and method for splitting input data from a databus into two segments and steering the segments to a processor core and a data cache while maintaining the timing of a system that does not split the input data.

SUMMARY OF THE INVENTION

In accordance with the present invention, the pin count and the data bus width of a processor is substantially reduced while effectively maintaining processor performance by using a staging register to receive and store a first data segment from a bus. A second data segment is received from the bus later and then both segments are stored together into a cache. A steering circuit dynamically selects the transfer of the first or the second segment to a processor core, and orders positioning of the first and second data segments to be stored in the cache.

In some embodiments, the cache is a first level cache and a second level cache is inserted between the bus and the processor. In these embodiments, the processor includes a bypassing circuit for directly forwarding the bus data in response to a CPU read request that misses the first level cache and hits the second level cache.

In accordance with another embodiment of the present invention, an interface for interfacing a bus to a processor core includes a staging register connected to the bus and a 2-to-1 multiplexer. The staging register receives a first data segment from the bus in a first bus timing cycle. The 2-to-1 multiplexer has a first input segment connected to the staging register, a second input segment connected to the bus, a control terminal connected to a select logic, and an output terminal connected to the processor core. The interface further includes a cache having a first segment and a second segment, a first cache data input multiplexer and a second cache data input multiplexer. The first cache data input multiplexer has a first input segment connected to the staging register, a second input segment connected to the bus, a third input segment connected to a store buffer, a control terminal connected to the select logic, and an output terminal connected to the first cache data input pathway. The second cache data input multiplexer has a first input segment connected to the staging register, a second input segment connected to the bus, a third segment connected to the store buffer, a control terminal connected to the select logic, and an output terminal connected to the second cache input pathway.

In accordance with a further embodiment of the present invention, a method of interfacing a bus to a processor core in a computer system includes staging a first data segment from the bus in a first bus timing cycle in a staging register, receiving a second data segment from the bus in a different bus timing cycle, and dynamically selects the transfer of the first data segment or the second data segment to the processor core.

Many advantages are gained by the described circuit and operating method. System cost is greatly reduced by reducing the input data bus width by one-half while maintaining the performance of a system utilizing a full-width bus. Furthermore, by eliminating routing of an additional 64-bit wide databus across the chip, the CPU die is made smaller and less expensive. Alternatively, the additional available chip space may be used to enhance functionality and performance of the system.

It is advantageous that the pin-count of the input databus of an integrated circuit is reduced by one-half. It is advantageous that the reduction in pin-count is achieved substantially without cost in timing. It is advantageous that data requested by a CPU is applied to the CPU core a fill cycle earlier in comparison to other reduced pin-count techniques. It is advantageous that calculation utilizing the first returned data be made a full cycle earlier without waiting for receipt of the second half of a 128-bit data. The calculation takes place simultaneous with transfer of the second half of the data.

The illustrative interface advantageously maintains a full-width level-1 cache structure and atomicity of a line-fill operation.

In an illustrative embodiment, the described circuit and operating method address cost and performance issues by integrating a 64-bit processors an on-chip level-1 data cache with a 128-bit line size, and a 64-bit CPU databus in an optimal arrangement.

BRIEF DESCRIPTION OF THE DRAWINGS

The features of the described embodiments believed to be novel are specifically set forth in the appended claims. However, embodiments of the invention, relating to both structure and method of operation, may best be understood by referring to the following description and accompanying drawings. The use of the same reference symbols in different drawings indicates similar or identical items.

DETAILED DESCRIPTION OF THE ILLUSTRATIVE EMBODIMENTS

SUN, SUN MICROSYSTEMS and the SUN LOGO are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.

Figure 1:
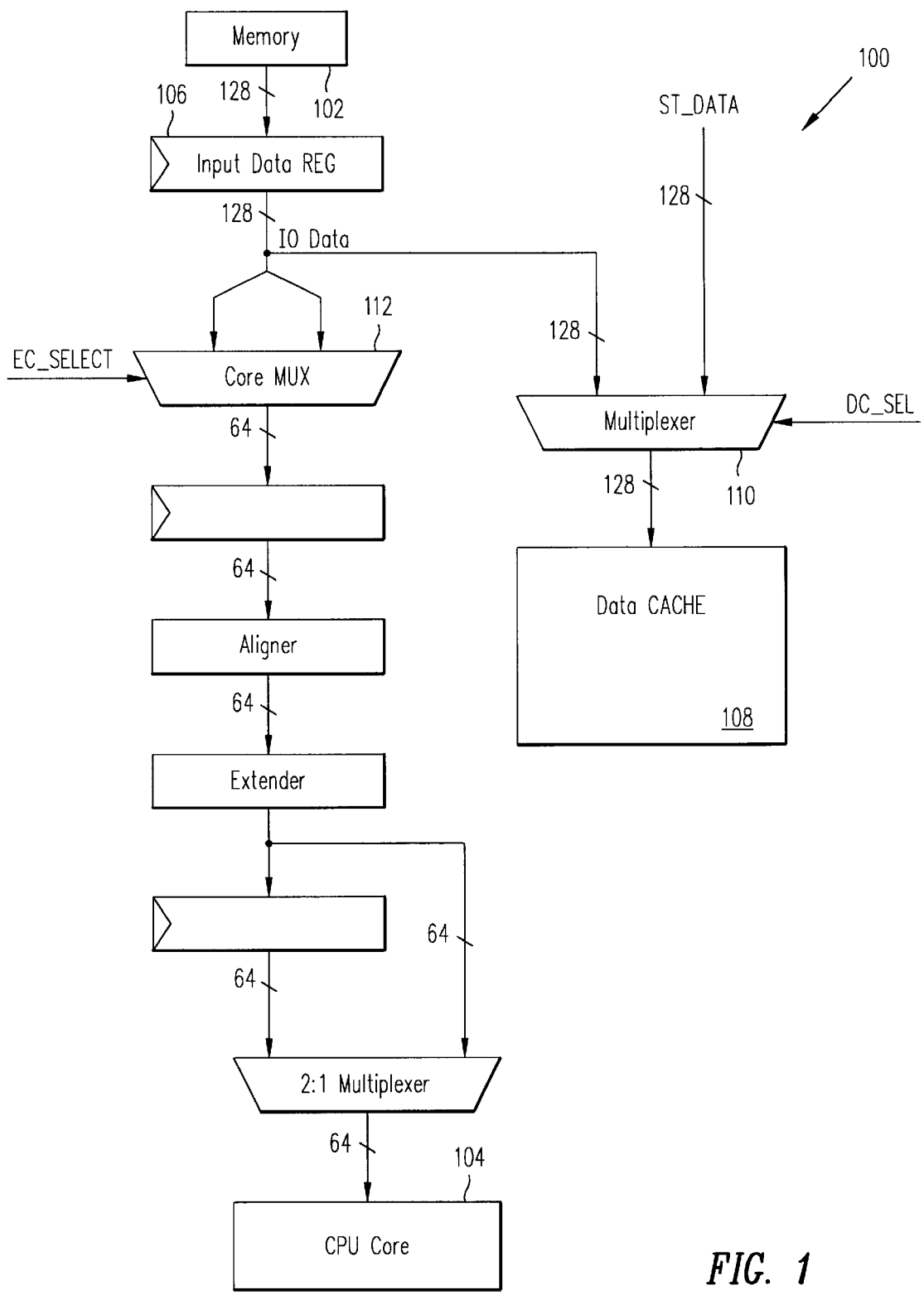
FIG. 1, labeled PRIOR ART, illustrates an advanced high-performance microprocessor having a 128-bit input data path.
Figure 2C:
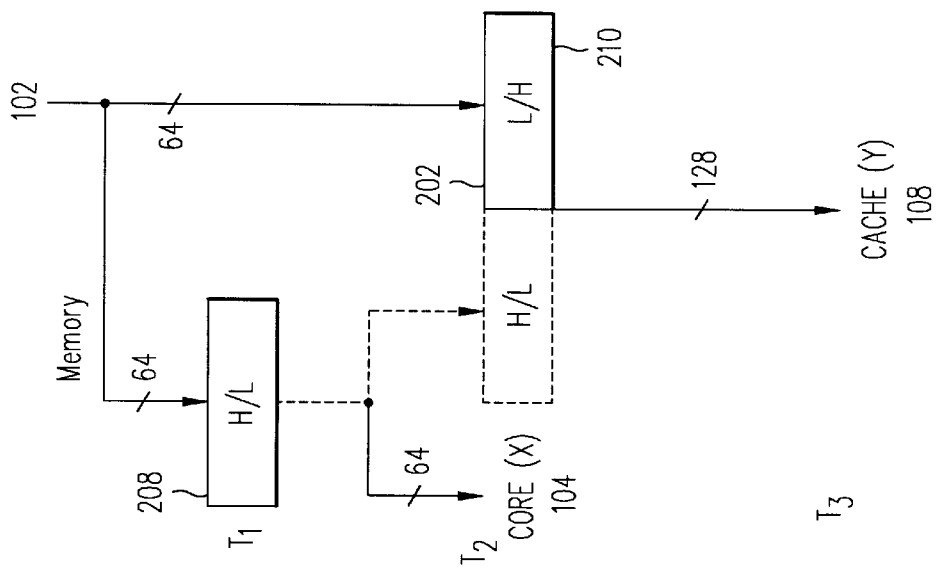
FIGS. 2A, 2B, and 2C depict schematic timing and input datapath diagrams illustrating three techniques for transferring data from a memory to a CPU core and having a data cache.
Figure 2B:
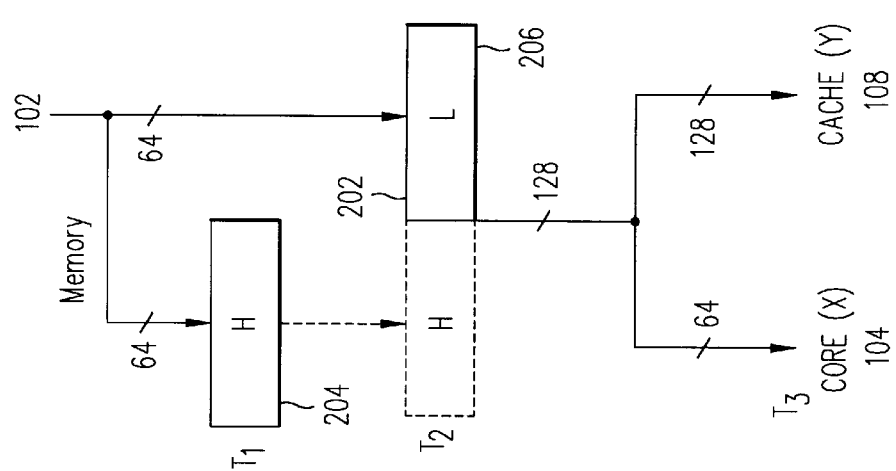
Figure 2A:
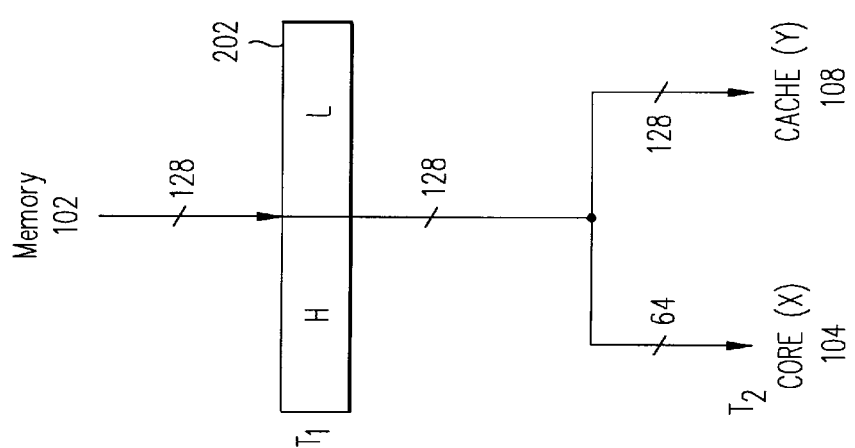

Referring to FIGS. 2A, 2B, and 2C, schematic timing and input datapath diagrams illustrate three techniques for transferring data from the memory 102 to the CPU core 104 using a data cache 108.

In FIG. 2A, a 128-bit input register 202 buffers data from the memory 102 in a high-order 64-bit segment H and a low-order 64-bit segment L. Data is transferred from the memory 102 to the 128-bit input data register 202 in a 128-bit block in a first timing cycle $T_1$. In a second timing cycle $T_2$, the 128-bit block of data (Y) is transferred from the input data register 202 to the data cache 108 and a 64-bit segment (X) of the 128-bit data in the input data register 202 is forwarded to CPU core 104 pipeline to begin processing. The 64-bit segment (X) may be either the high-order 64-bit segment (H) or the low-order 64-bit segment (L) from the input data register 202 depending upon which segment is requested by the CPU. The technique illustrated in FIG. 2A achieves high performance at the expense of supporting a 128-bit data bus.

The cost of supporting 128 pins is prohibitive so that, in FIG. 2B, a technique is illustrated that allows reduction of the data bus size from 128 bits to-64 bits. The 128-bit input data register 202 is considered to include a 64-bit high-level register 204 and a 64-bit low-level register 206. In the first timing cycle $T_1$, a first 64-bit data segment from the memory 102 is transferred or "staged" to the 64-bit high-level register 204. In the second timing cycle $T_2$, a 64-bit data segment from the memory 102 is transferred to the 64-bit low-level register 206. In the third timing cycle $T_3$, a 64-bit data segment requested by the CPU is forwarded to CPU core 104 pipeline to begin processing. Also during the third timing cycle $T_3$, the 128-bit block of data (Y) is transferred from the input data register 202 to the data cache 108.

The technique illustrated in FIG. 2B advantageously reduces the number of pins allocated for connection to an input databus by one-half, thereby reducing computer system cost. Also advantageously, the number of pins is reduced by one-half using a simple circuit that is easily implemented. The savings in pins is achieved at the expense of delaying execution of data acquired from the memory 102 by one timing cycle. Also disadvantageously, data is constrained to return from L2 cache with the high-order 64-bit segment received first and the low-order 64-bit segment received second. Thus, no matter which 64-bit segment is sought by the CPU core 104, the full 128 bits must be received before execution of an instruction operating upon the data is possible.

In FIG. 2C, a technique is illustrated that allows reduction of the data bus size from 128 bits to 64 bits while avoiding the timing delay incurred through implementation of the technique described in FIG. 2B. In FIG. 2C, the 128-bit input data register 202 is considered to include a 64-bit high-or-low-level register 208 and a 64-bit low-or-high level register 210. Thus, the register 208 is either loaded with high-order data or low-order data as directed by a request made by the CPU. The CPU is a 64-bit processor and, based upon the instruction sequence being executed, whether the high-order or low-order 64-bit segment is to be operated upon is known or predictable to the CPU. Accordingly, the CPU specifies whether the high-order or low-order 64-bit data segment is to be applied to the CPU core 104 while the nonspecified segment is transferred to the data cache 108 in a next timing cycle. Advantageously, execution of an instruction that operates upon the selected 64-bit segment is performed one cycle earlier, improving performance of the CPU. Data is transferred from the memory 102 to the 64-bit high-or-low-level register 208 in a 64-bit block in a first dining cycle $T_1$. In the second timing cycle $T_2$, the 64-bit data in the 64-bit high-or-low-level register 208 is forwarded to CPU core 104 pipeline to begin processing and maintained in the 64-bit high-or-low-level register 208. Also in the second timing cycle $T_2$, the low-order data or high-order data associated with the data transferred during the first timing cycle $T_1$, data is transferred from the memory 102 to the 64-bit low-or-high level register 210. Thus, the result of the first timing cycle $T_1$ and the second timing cycle $T_2$ is a transfer of data from the memory 102 to the 128-bit input data register 202 with the position of the high-order and low-order 64-bit blocks determined by the CPU. In the third timing cycle $T_3$, the 128-bit block of data (Y) is transferred from the input data register 202 to the data cache 108. The technique illustrated in FIG. 2C reduces the number of pins allocated for connection to an input databus by one-half, thereby reducing computer system cost, while advantageously maintaining the timing of a system using a full-width databus for receiving the first 64-bit segment. The timing for receiving the second 64-bit segment is delayed by one cycle but the CPU computation may effectively approach the performance of the system having a 128-bit input data bus.

Figure 3:
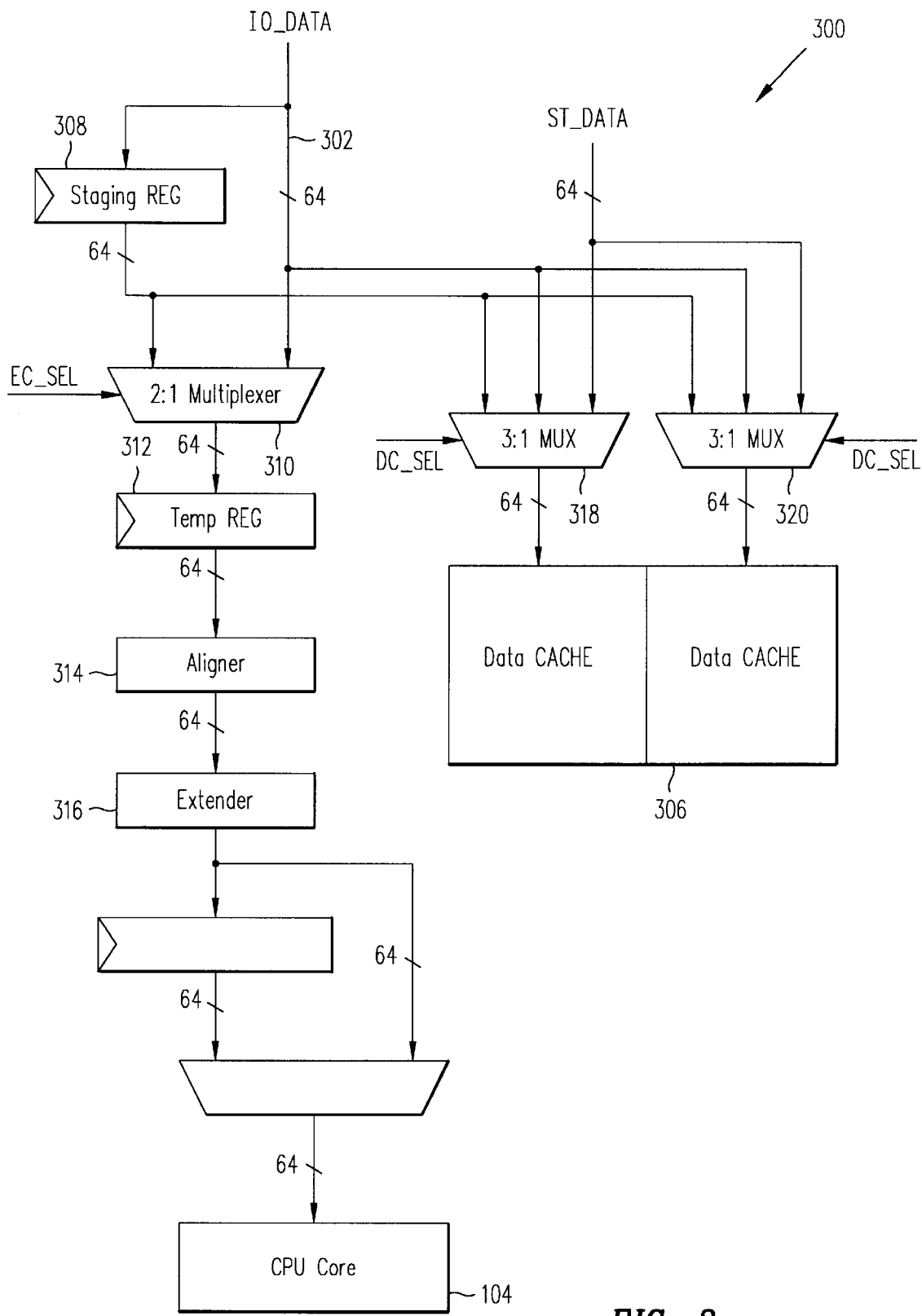
FIG. 3 is a schematic block diagram illustrating a data input pathway connecting a 64-bit input/output (I/O) data bus to a 64-bit processor core in a processor including a 128-bit data cache in accordance with an embodiment of the present invention.

Referring to FIG. 3, a schematic block diagram illustrates a data input pathway 300 connecting a 64-bit input/output (I/O) data bus 302 to a 64-bit processor core 304 and including a data cache with a 128-bit line size 306. The 64-bit I/O data bus 302 is connected to a 64-bit I/0 staging register 304. The 64-bit I/O staging register 304 is inserted in the data input pathway 300 to temporarily store a first 64-bit data return and allow selection of ordering of the high-order and the low-order 64-bit segments of a 128-bit input data line.

A 2-to-1 input multiplexer 310 is connected to the 64-bit I/O staging register 308 to select a first 64-bit input data segment and connected to the 64-bit I/O data bus 302 to select a second 64-bit input data segment. The 2-to-1 input multiplexer 310 selects a 64-bit input operand for direct application to the 64-bit processor core 304 during the second timing cycle and selects either the staged 64-bit data segment via the 64-bit I/O staging register 308 or directly from the 64-bit I/O data bus 302. The selection is made by the CPU using an input selection signal, EC_SEL. In the illustrative embodiment, input selection signal EC_SEL of 1 selects the staged 64-bit data segment and an input selection signal EC_SEL of 0 selects data directly from the bus. The 2-to-1 input multiplexer 310 passes the selected 64-bit signal to a temporary register 312, an aligner 314, and a sign-extender 316, passing the selected 64-bit data segment to the processor core 304. The data input pathway 300 also passes the 128-bit input data to the data cache 306 with a 128-bit line size.

The data cache 306 is connected to the data input pathway 300 via two 64-bit 3-to-1 cache data select multiplexers 318 and 320. The three input connections to the 3-to-1 multiplexers 318 and 320 are the same and include the first 64-bit input data segment from the 64-bit I/O staging register 308, the second 64-bit input data segment directly from the 64-bit I/O data bus 302, and a 64-bit store data bus ST_DATA from the processor core 304. The 3-to-1 multiplexers 318 and 320 receive a data cache control signal DC_SEL to select a 64-bit input data segment from the three selections. DC_SEL [2],[1],[0] are mutually exclusive, i.e. one and only one bit has a value 1 at any time. In one example, the data cache control signal DC_SEL [2]=1 selects a data cache store operation while data cache control signals $DC_{13}$ SEL[1]=1 or [0]=1 select a cache fill operation. A data cache control signal DC_SEL [1]=1 selects the high-order 64-bit data segment and a data cache control signal DC_SEL[0]=1 selects the low-order 64-bit segment.

The 3-to-1 cache data select multiplexer 318 selects a 64-bit half-line of data for application to a high-order 64-bit portion of the 128-bit data cache 306. The 3-to-1 cache data select multiplexer 320 selects a 64-bit half-line of data for application to a low-order 64-bit portion of the 128-bit data cache 306. The 64-bit 3-to-1 cache data select multiplexers 318 and 320 are applied between the data input pathway 300 and the 128-bit data cache 306 rather than 2-to-1 multiplexers to support selection of one of three data sources including high-order data from the 64-bit I/O data bus 302, low-order data from the 64-bit I/O data bus 302, or data from the CPU core 104 via the 64-bit store data bus ST_DATA. Usage of the 64-bit 3-to-1 cache data select multiplexers 318 and 320 allows selective ordering of high and low order 64-bit data segments in the 128-bit data cache 306.

The input selection signal EC_SEL and the data cache control signal DC_SEL are controlled by the CPU to select the data applied to the processor core 304 in a particular timing cycle or portion of a timing cycle and to select the ordering of the data within the 128-bit data cache 306. Data ordering is controlled to first operate upon or store high-order data or low-order data in a single timing cycle. Data ordering is also controlled to select data that is transferred in different timing cycles.

TABLE I, a truth table, describes the operation of the data input pathway 300 in response to the data cache control signal DC_SEL, a fill request signal a data acknowledge signal a low-address bit A[3] designating and 8-byte boundary signal that determines whether the data segment is the high-order data segment or the low-order data segment.

TABLE I

| DC_SEL | Fill Request | Data Ack | A[3] | dcd_d_high | dcd_d_low |
| --- | --- | --- | --- | --- | --- |
| [2] | 0 | X | X | st_data | st_data |
| [1] | 1 | 1 | X | staged data | databus data |
| [1] | 1 | 0 | 0 | staged data | databus data |
| [0] | 1 | 0 | 1 | databus data | staged data |

The data cache control signal DC_SEL selects a 64-bit data segment from among the high-order data and the low-order data from the 64-bit I/O data bus 302, and the 64-bit store data bus ST_DATA. FM Request designates whether the cache operation is a cache fill (1) in which the cache is to be filled from the 64-bit I/O data bus 302 or the cache operation is a store (0) from the processor core 104 via a store buffer (not shown). The bit A[3] designates the selected data segment, the 8-byte boundary of the transmitted data. A[3] is equal to 0 for high-order data bits 127:64 and the bit A[3] is equal to 1 for low-order data bits 63:0.

The data acknowledge signal (Data Ack) designates a data source in the event of a cache miss in the first level (L1) data cache 306. Upon the occurrence of a cache miss of the first-level (L1) 128-bit data cache 306, two conditions are possible. First, the requested data that is missing in the first-level (L1) 128-bit data cache 306 is residing in a level-2 (L2) cache. Second, the requested data is missing both from the first level (L1) 128-bit data cache 306 and a second-level (L2) data cache (not shown) so that a cache fill is successfully performed only by retrieving data from beyond the second-level L2 cache in a memory (not shown). For a storage access that misses both the level 1 (L1) cache and the level 2 (L2) cache, data is retrieved from memory in an access that is more subject to errors, such as parity errors and ECC errors, than data accesses to a cache. Upon the occurrence of an error condition, a memory controller (not shown) recovers from the error by issuing an additional read to the accessed memory, acquiring the data, and checking for further parity and ECC errors. Due to the possibility of errors during memory accesses, the latency of a transfer becomes unpredictable, dependent upon memory type, and not easily scaleable. The data acknowledge signal (Data Ack) is added as a truth table parameter to designate whether a level-2 (L2) cache miss has occurred. Thus a data acknowledge signal (Data Ack) value of 1 designates that a level-2 (L2) cache miss has occurred. A data acknowledge signal (Data Ack) value of 0 is invoked for a level-2 (L2) cache hit.

The illustrative implementation of the data acknowledge signal (Data Ack) is optimized for a level-1 (L1) cache miss and a level-2 (L2) cache hit. Such an optimization is suitable for a system with a large level-2 (L2) cache so that an L2 cache miss is rare. In various alternative embodiments, the data acknowledge signal (Data Ack) may be optimized differently. For example, the memory type and memory latency may be taken into consideration to determine the probability and duration of multiple memory accesses in an error condition such as a memory error or a parity error. Using these considerations, the data acknowledge signal (Data Ack) may evoke a different response to most efficiently select an input data segment.

Referring to TABLE I, when the data cache control signal DC_SEL [2]=1 and the Fill Request signal is 0, a cache store operation is invoked and data is always loaded to the 128-bit data cache 306 from the store buffer no matter what values are applied to the data acknowledge signal (Data Ack) and the low-address bit A[3]. In the illustrative embodiment, the data acknowledge signal (Data Ack) and low-address bit A[3] do not affect the order of placement of stored data into the 128-bit data cache 306 since the return order of stored data is fixed by specification. In other embodiments, selectable placement of the stored data may be implemented.

When the data cache control signal DC-SEL has a value of either 1 or 2, a 64-bit data segment is loaded to the 128-bit data cache 306 either directly from the 64-bit I/O data bus 302 (databus data) or from the 64-bit I/O staging register 304 (staged data). When the FM Request signal is 1 and the data acknowledge signal (Data Ack) is 1, the low-address bit A[3] is disregarded, the high-order 64-bit data segment is loaded from the 64-bit I/O staging register 308 into the high-order half of the 128-bit data cache 306 and the low-order 64-bit data segment is loaded directly from the 64-bit I/O data bus 302 into the low-order half of the 128-bit data cache 306. The high-order 64-bit data segment is loaded from the 64-bit I/O staging register 308 to the processor core 304 using the 2-to-1 input multiplexer 310. The data acknowledge signal (Data Ack) thus overrides selection by the low-address bit A[3] by definition in the event of a level-2 cache miss.

When the Fill Request signal is 1 and the data acknowledge signal (Data Ack) is 0 a level-1 (L1) cache fill operation is evoked and the order of data transfer to the processor core 104 and the 128-bit data cache 306 is determined by the low-address bit A[3]. If low-address bit A[3] is 0, the high-order 64-bit data segment is loaded from the 64-bit I/O staging register 308 into the high-order half of the 128-bit data cache 306 and the low-order 64-bit data segment is loaded directly from the 64-bit I/O data bus 302 into the low-order half of the 128-bit data cache 306. The CPU is thus requesting the high-order data so the high-order 64-bit data segment is forwarded from the 64-bit I/O data bus 302 to the processor core 104 using the 2-to-1 input multiplexer 310.

If the low-address bit A[3] is 1, the high-order 64-bit data segment is loaded directly from the 64-bit I/O data bus 302 into the higher-order half of the 128-bit data cache 306 and the low-order 64-bit data segment is loaded from the 64-bit I/O staging register 308 into the lower-order half of the 128-bit data cache 306. The CPU is requesting the low-order data first so that the low-order 64-bit data segment is forwarded directly from the 64-bit I/O data bus 302 to the processor core 104 using the 2-to-1 input multiplexer 310.

Data requested by the CPU for application to the processor core 104 advantageously arrives at the processor core 104 a full cycle earlier than occurs using the alternative embodiment shown in FIG. 2B. By receiving requested data one cycle earlier at the processor core 104, the processor begins executing instructions operating upon the input data a fill cycle earlier, before the full 128 bits are accumulated and transferred to the data cache 306. Advantageously, execution begins on the first 64-bit data segment in parallel with the transfer of the second 64-bit data segment. Accordingly, the central processing unit (CPU) begins calculation ahead of the level-1 (L1) cache fill operation. The level-1 (L1) 128-bit data cache 306 is constrained to wait until the entire 128-bit input is accumulated before the line fill occurs. Performance of the processor is improved due to the early execution of calculation instructions since a delay of one-cycle in waiting for the entire 128-bit level-1 (L1) cache miss data is avoided.

Figure 4:
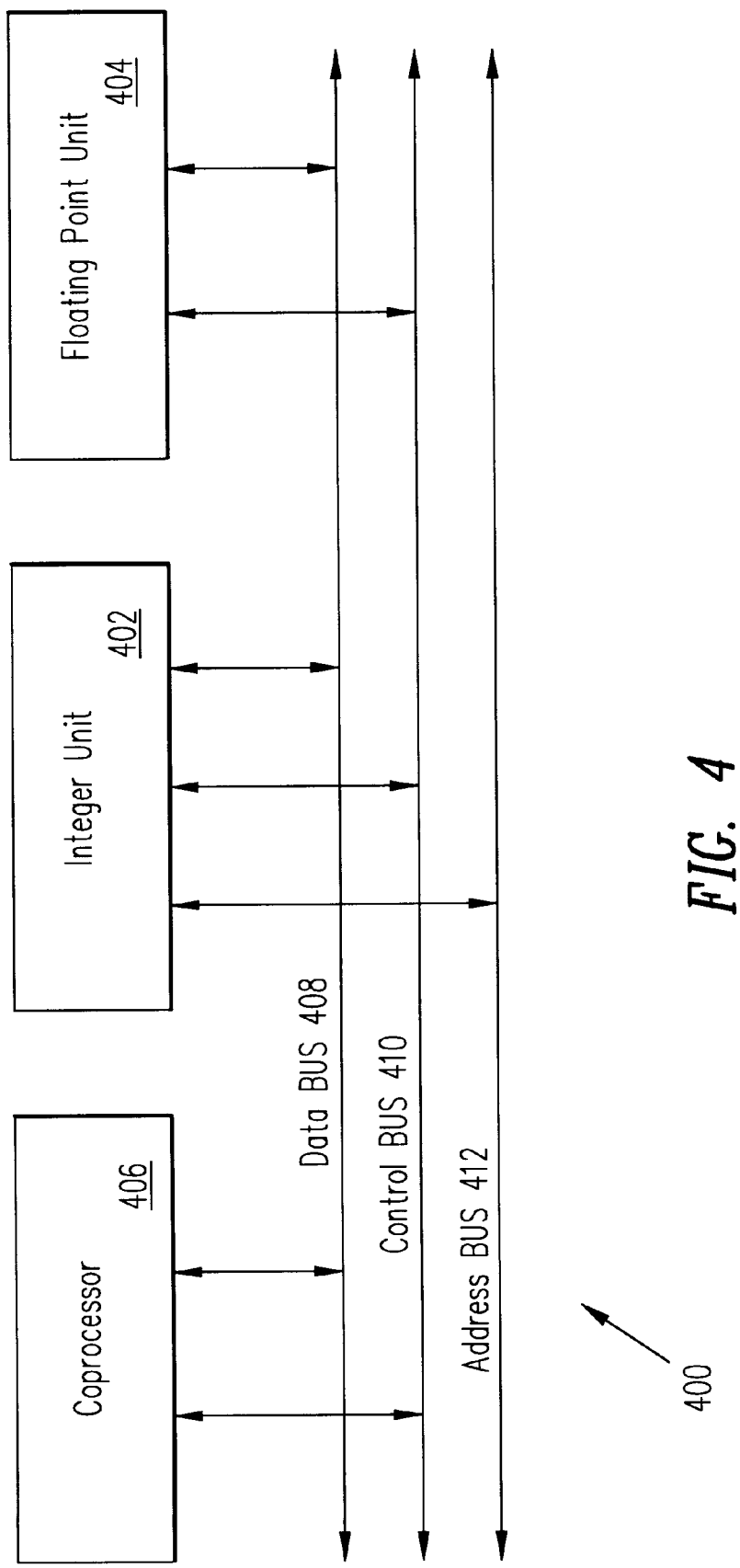
FIG. 4 is a schematic block diagram illustrating a system architecture which is suitable for implementation of a processor having a reduced-pin-count input datapath.

Referring to FIG. 4, a schematic block diagram illustrates a system architecture 400 suitable for implementation of a processor 400 having a reduced-pin-count input datapath. The illustrative architecture has a linear, 64-bit virtual address space for user application programs, and a flexible databus size for system architecture optimization. An integer unit 402 executes a defined instruction set and data types using a specified register structure. Most integer instructions have single-cycle execution. A floating point unit 404 executes a defined floating point instruction set using defined data types and a floating point register structure. The floating point unit 404 supports single, double, and quad precision operands and operations. The floating point unit 404 and the integer unit 402 execute floating point and integer instructions concurrently with architectural support for program concurrency.

A coprocessor 406 is included in the architecture 400 in the illustrative system. The integer unit 402, the floating point unit 404, and the coprocessor 406 interact via a data bus 408, a control bus 410, and an address bus 412.

Figure 5:
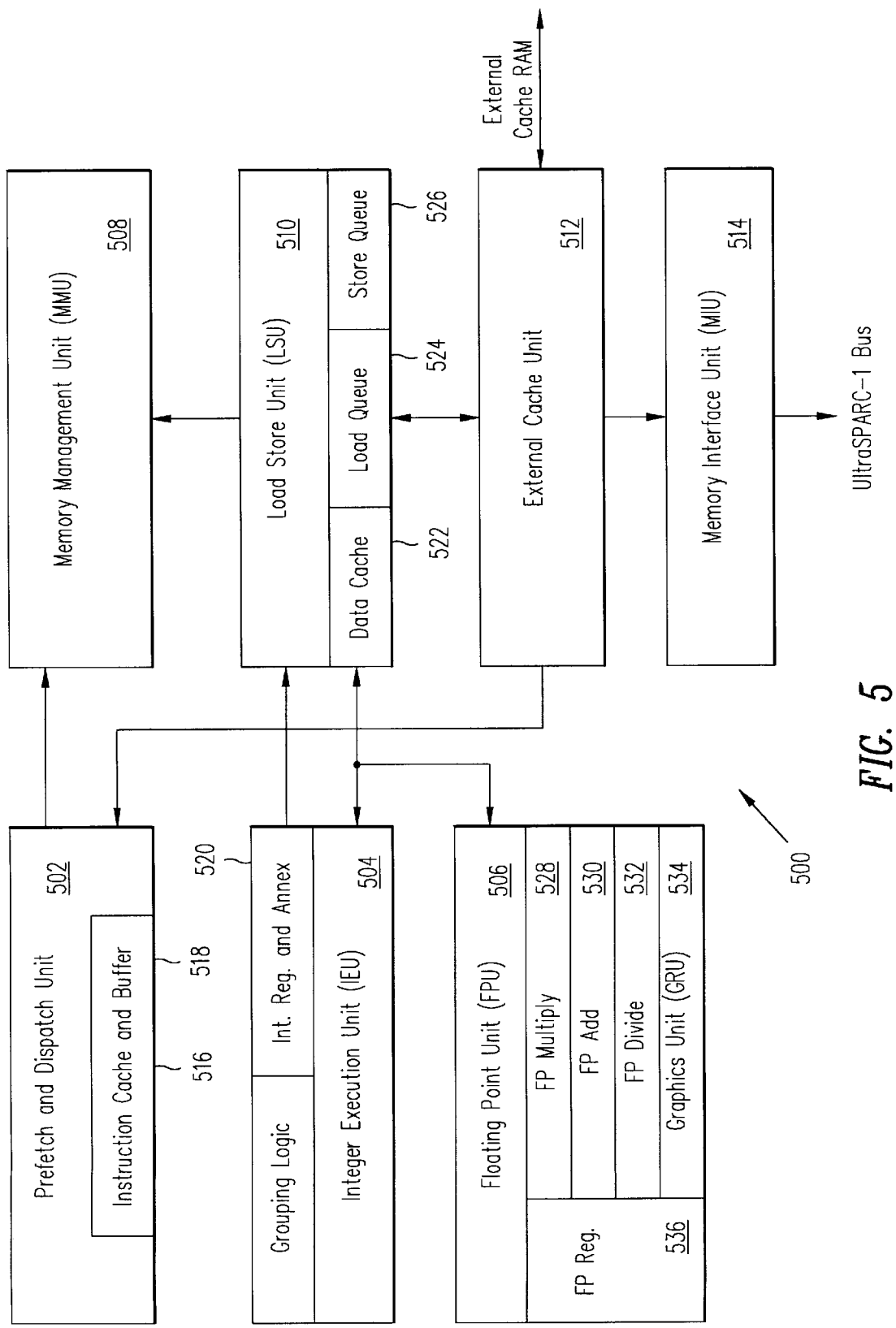
FIG. 5 is a suitable processor for implementing a reduced-pin-count input datapath.

Referring to FIG. 5, a suitable processor 500 for implementing a reduced-pin-count input datapath is shown. The processor 500 includes a prefetch and dispatch unit 502, an integer execution unit 504, a floating point unit 506, a memory management unit 508, a load store unit 510, an external cache unit 512, and a memory interface unit 514. The prefetch and dispatch unit 502 fetches instructions into a pipeline (not shown) before the instructions are needed, assuring that all execution units are busy. The prefetch and dispatch unit 502 fetches instructions from all levels of a memory hierarchy including an instruction cache 516, an external cache (not shown) and a main memory (not shown). The prefetch and dispatch unit 502 includes the instruction cache 516 and a prefetch buffer 518 that decouples instruction prefetching from instruction dispatch, thereby preventing pipeline stalls. The prefetch and dispatch unit 502 also includes support for dynamic branch prediction to allow the processor 500 to prefetch instructions and prepare the instructions for execution by various instruction execution units.

The integer execution unit 504 includes multiple arithmetic logic units (ALUs) for executing arithmetic, logical, and shift operations. The integer execution unit 504 also includes a multiple-window register file 520 for accessing data during computational execution of instructions. The integer execution unit 504 operates in conjunction with the load store unit 510 for accessing data, executing arithmetic, logical, and shift operations on the data, and storing the calculated data into storage. When a load operation is issued, the integer execution unit 504 address operands from the register file 520. If the operands are contained in the pipeline, a read of the register file 520 is bypassed and data is accessed from the internal pipeline. Once the address operands are obtained, the address operands are added to obtain the memory address of a sought item. The calculated address is registered in the integer execution unit 504 and written to the register file 520. When a store operation is issued, the integer execution unit 504 reads the sought operands from the register file 520. A register read may be bypassed if sought operands are contained in the pipeline. Once the operands are obtained, the store operand register physical address is computed to determine the virtual address of a store operation. The store data is registered by a data cache 522 and written.

The load store unit 510 includes the data cache 522, a load queue 524, and a store queue 526.

The floating point unit 506 is a pipelined floating point processor that includes five separate functional units, specifically a floating point multiply unit 528, a floating point add unit 530, a floating point divide unit 532, a graphics unit 534. The separate function units allow the processor 500 to execute multiple floating point instructions per cycle. Source and data results are stored in a 32-entry register file 536.

The memory management unit 508 handles memory operations and arbitrates between data stores and memory. The memory management unit 508 implements virtual memory and translates virtual addresses of each running process to physical addresses in memory. The memory management unit 508 supports memory protection to prohibit a process from reading or writing the address space of another process.

The memory interface unit 514 is an input/output subsystem that controls input and output transfers between local resources including the processor 500, main memory, control space, and external system resources. In particular, the memory interface unit 514 manages all transactions to a system including external cache misses, interrupts, snoops, and writebacks.

The external cache unit 512 manages instruction and data cache misses. High-performance microprocessors use caches to reduce bus traffic and increase system throughput. Cache stores contain copies of part of a memory image. A choice of updating or invalidating copies of modified blocks is made according to a cache consistency protocol, ensuring that copies of data in the cache remain consistent with copies in main memory. The data cache 522 is a direct-mapped, software selectable write-through non-allocating cache that is used on load and store accesses from the processor 500 to cacheable pages of main memory. The instruction cache 516 is a two-way set-associative cache used on instruction fetch accesses from the processor 500 to cacheable pages of main memory.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the parameters, materials, and dimensions are given by way of example only and can be varied to achieve the desired structure as well as modifications which are within the scope of the invention Variations and modifications of the embodiments disclosed herein may be made based on the description set forth herein, without departing from the scope and spirit of the invention as set forth in the following claims.

For example, although the illustrative embodiments describe the data input pathway 300 in terms of an input connection to a central processing unit (CPU) in other embodiments, other types of processors or computational units may be employed such as special-purpose processing units.

What is claimed is:

1. A computer system interface for interfacing a bus having a bus width number of bits divided into a plurality of data segments to a processor core, the computer system interface comprising:

a staging register coupled to the bus, the staging register having a number of bits less than the bus width number of bits and receiving a data segment dynamically selected from among the plurality of data segments of the bus in a first bus timing cycle;

a steering circuit coupled to the staging register and coupled to the bus, the steering circuit dynamically selecting transfer to the processor core of the data segment staged in the staging register or a data segment dynamically accessed directly from among the plurality of data segments of the bus; and a cache coupled to the staging register and coupled to the bus, the cache receiving a data segment dynamically selected from the plurality of data segments of the bus in a second bus timing cycle, wherein:

the steering circuit is further coupled to the cache, the steering circuit dynamically and selectively ordering positioning of the data segment to be stored in the cache;

the cache has a first segment and a second segment; and the steering circuit includes:

a first 3-to-1 multiplexer having a first input segment coupled to the staging register, a second input segment coupled to the bus, a third input segment coupled to a store buffer, a control terminal coupled to a processor control logic, and an output terminal coupled to the first segment of the cache; and a second 3-to-1 multiplexer having a first input segment coupled to the staging register, a second input segment coupled to the bus, a third input segment coupled to the store buffer, a control terminal coupled to the processor control logic, and an output terminal coupled to the second segment of the cache.

2. The interface according to claim 1, wherein:

the cache is a first level cache;

the bus is connected to a second level cache; and the interface further includes:

a bypassing circuit coupled to the steering circuit, the bypassing circuit supplying the CPU core requested data that misses the first level cache and hits the second level cache, as soon as the requested data arrives from the bus.

3. The interface according to claim 1, wherein: the bus has a width of 64 bits;

the processor core is a 64-bit processor core; and the cache has a line width of 128 bits.

4. The interface according to claim 1, wherein:

the steering circuit includes a 2-to-1 multiplexer having a first input segment coupled to the staging register, a second input segment coupled to the bus, a control terminal coupled to the processor control logic, and an output terminal coupled to the processor core.

5. The interface according to claim 1, wherein:

the bus is a data bus.

6. The interface according to claim 1, wherein:

the bus has two data segments that are equal in size.

7. An interface for interfacing a bus having a bus width number of bits divided into a plurality of data segments to a processor core, the interface comprising:

a staging register having a number of bits less than the bus width number of bits and coupled to the bus, the staging register receiving a data segment dynamically selected from among the plurality of data segments of the bus in a first bus timing cycle;

a 2-to-1 multiplexer having a first input terminal coupled to the staging register, a second input terminal coupled to the bus, a control terminal coupled to a select logic, and an output terminal coupled to the processor core, the 2-to-1 multiplexer dynamically selecting transfer to the processor core of the data segment staged in the staging register or a data segment dynamically accessed directly from among the plurality of data segments of the bus;

a cache having a first segment and a second segment;

a first cache multiplexer having a first input terminal coupled to the staging register, a second input terminal coupled to the bus, a control terminal coupled to the select logic, and an output terminal coupled to the first cache segment; and a second cache multiplexer having a first input terminal coupled to the staging register, a second input terminal coupled to the bus, a control terminal coupled to the select logic, and an output terminal coupled to the second cache segment, wherein:

the first cache multiplexer is a 3-to-1 multiplexer having a third input terminal coupled to a store buffer; and the second cache multiplexer is a 3-to-1 multiplexer having a third input terminal coupled to the store buffer.

8. The interface according to claim 7 wherein:

the select logic includes a logic for dynamically selecting transfer to the processor core of the data segment staged in the staging register or a data segment dynamically accessed directly from among the plurality of data segments of the bus.

9. The interface according to claim 7 wherein:

the select logic includes a logic for dynamically and selectively ordering positioning of the data segment staged in the staging register or a data segment dynamically accessed directly from among the plurality of data segments for storage in the cache.

10. The interface according to claim 7 wherein: the cache is a first level cache;

the bus is connected to a second level cache; and the select logic further includes:

a logic for designating ordering of the data segment staged in the staging register or a data segment dynamically accessed directly from among the plurality of data segments in response to a memory access that misses the first level cache and hits the second level cache.

11. The interface according to claim 7 wherein: the bus has two data segments that are equal in size.

12. A processor comprising:

a processor core;

a bus having a bus width number of bits divided into a plurality of data segments coupled to the processor core; and an interface coupling the processor core to the bus, the interface including:

a staging register having a number of bits less than the bus width number of bits and coupled to the bus, the staging register receiving a data segment dynamically selected from among the plurality of data segments of the bus in a first bus timing cycle;

a steering circuit coupled to the staging register and coupled to the bus, the steering circuit dynamically selecting transfer to the processor core of the data segment staged in the staging register or a data segment dynamically accessed directly from among the plurality of data segments of the bus; and a cache coupled to the staging register and coupled to the bus, the cache receiving a data segment dynamically selected from the plurality of data segments of the bus in a second bus timing cycle, wherein:

the steering circuit is further coupled to the cache, the steering circuit dynamically and selectively ordering positioning of the data segment in the cache;

the cache has a first segment and a second segment; and the steering circuit includes:

a first 3-to-1 multiplexer having a first input segment coupled to the staging register, a second input segment coupled to the bus, a third input segment coupled to a store buffer, a control terminal coupled to a processor control logic, and an output terminal coupled to the first segment of the cache; and a second 3-to-1 multiplexer having a first input segment coupled to the staging register, a second input segment coupled to the bus, a third input segment coupled to the store buffer, a control terminal coupled to the processor control logic, and an output terminal coupled to the second segment of the cache.

13. The processor according to claim 12, wherein:

the cache is a first level cache;

the bus is connected to a second level cache; and the interface further includes:

a bypassing circuit coupled to the steering circuit, the bypassing circuit designating ordering of the data segment in response to a memory access that misses the first level cache and hits the second level cache.

14. The processor according to claim 12, comprising: wherein:
   the bus has a width of 64 bits;
   the processor core is a 64-bit processor core; and
   the cache has a line width of 128 bits.

15. The processor according to claim 12, wherein:
   the steering circuit includes a 2-to-1 multiplexer having a first input segment coupled to the staging register, a second input segment coupled to the bus, a control terminal coupled to the processor control logic, and an output terminal coupled to the processor core.

16. A computer system comprising:
   a bus having a bus width number of bits divided into a plurality of data segments;
   a processor coupled to the bus; and
   an interface coupling the bus to the processor core, the interface including:
      a staging register having a number of bits less than the bus width number of bits and coupled to the bus, the staging register receiving a data segment dynamically selected from among the plurality of data segments of the bus in a first bus timing cycle;
      a steering circuit coupled to the staging register and coupled to the bus, the steering circuit dynamically selecting transfer to the processor core of the data segment staged in the staging register or a data segment dynamically accessed directly from among the plurality of data segments of the bus; and
      a cache coupled to the staging register and coupled to the bus, the cache receiving a data segment dynamically selected from the plurality of data segments of the bus in a second bus timing cycle, wherein:
         the steering circuit is further coupled to the cache, the steering circuit dynamically and selectively ordering positioning of the first data segment and the second data segment in the cache;
      the cache has a first segment and a second segment; and
      the steering circuit includes:
         a first 3-to-1 multiplexer having a first input segment coupled to the staging register, a second input segment coupled to the bus, a third input segment coupled to a store buffer, a control terminal coupled to a processor control logic, and an output terminal coupled to the first segment of the cache; and
         a second 3-to-1 multiplexer having a first input segment coupled to the staging register, a second input segment coupled to the bus, a third input segment coupled to the store buffer, a control terminal coupled to the processor control logic, and an output terminal coupled to the second segment of the cache.

17. The computer system according to claim 16, wherein:
   the cache is a first level cache;
   the computer system further includes a second level cache coupled to the bus; and
   the interface further includes:
      a bypassing- circuit coupled to the steering circuit, the bypassing circuit designating ordering of a data segment in response to a memory access that misses the first level cache and hits the second level cache.

18. The computer system according to claim 16, wherein:
   the bus has a width of 64 bits;
   the processor core is a 64-bit processor core; and
   the cache has a line width of 128 bits.

19. The computer system according to claim 16, wherein:
   the steering circuit includes a 2-to-1 multiplexer having a first input segment coupled to the staging register, a second input segment coupled to the bus, a control terminal coupled to the processor control logic, and an output terminal coupled to the processor core.

* * * * *